D. C. LEFFERTS.
PROCESS OF GRADING AND STERILIZING FRUIT.
APPLICATION FILED NOV. 15, 1910.

985,745.

Patented Feb. 28, 1911.

Witnesses
Jo. F. Collins.
R. Craig Greene

Inventor
Dwight C. Lefferts,
By Wallace Greene,
Attorney

UNITED STATES PATENT OFFICE.

DWIGHT C. LEFFERTS, OF REDLANDS, CALIFORNIA, ASSIGNOR OF ONE-HALF TO GEORGE D. PARKER, OF RIVERSIDE, CALIFORNIA.

PROCESS OF GRADING AND STERILIZING FRUIT.

985,745.  Specification of Letters Patent.  Patented Feb. 28, 1911.

Application filed November 15, 1910. Serial No. 592,458.

*To all whom it may concern.*

Be it known that I, DWIGHT C. LEFFERTS, a citizen of the United States, residing at Redlands, in the county of San Bernardino and State of California, have invented certain new and useful Improvements in Processes of Grading and Sterilizing Fruit, of which the following is a specification, reference being had therein to the accompanying drawing.

This invention relates to grading fruit according to its specific gravity and sterilizing its exterior while leaving the fruit itself unchanged internally or externally and free from all extraneous matter used in the process.

The ordinary methods of grading are not entirely satisfactory, slightly frosted fruit, for example, not being properly sorted out from that which is unfrosted and heavier. It is also well known that externally sterilized fruit will keep longer than that not thus treated, and this fact leads to the use of sterilizing material which leaves the fruit permanently unpleasant to the senses and deleterious, as well as in such condition that it must be dried, artificially or with serious loss of time, before it can safely be packed.

In accordance with my invention, the agent employed is a liquid of a specific gravity between that of the lighter and the heavier or first grade fruit, and is also a highly volatile liquid which quickly and completely evaporates without attacking the fruit, or in other words leaving the fruit dry and absolutely unchanged. It is also of such character that it destroys animal and vegetable germs with which it comes in contact, so that the sterilization is an incident of grading, or vice versa. I have discovered that alcohol is such a liquid and I consider it more desirable for this use than any other liquid with which I am acquainted. In using it, I have placed a considerable quantity in a suitable receptacle, making the depth of the liquid more than twice the diameter of the largest fruit to be treated, and have temporarily immersed the free fruit in this bath, allowing the heavier to sink below the plane of the lighter, and have then removed the two grades separately, by hand or otherwise, allowing the liquid to evaporate, which it will quickly do, leaving all the fruit dry and sterilized.

Figure 1:
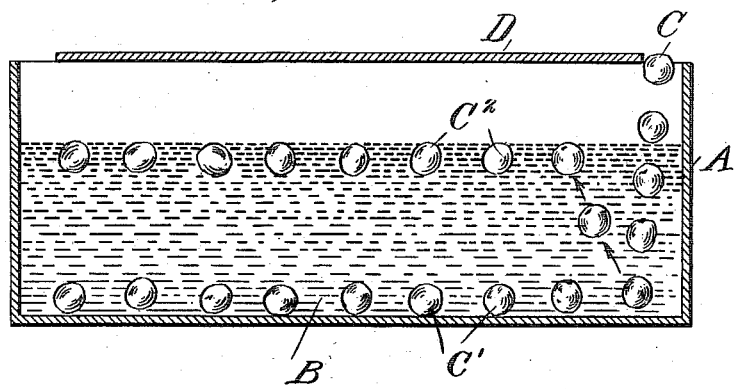
Figure 2:
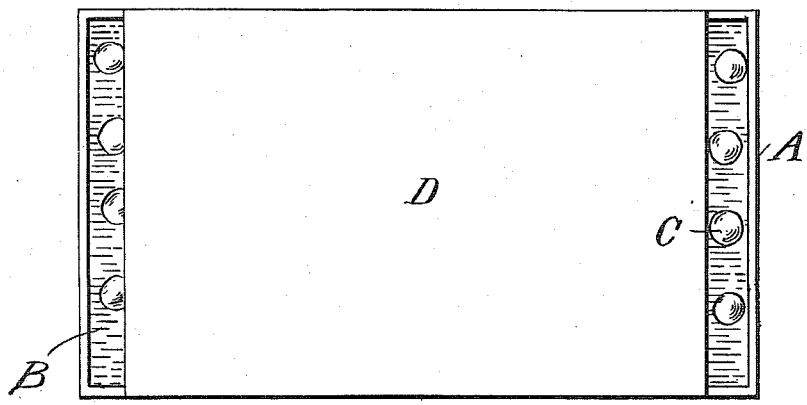

For the purpose of illustration, I have shown a very simple form of apparatus in the accompanying drawings, in which, Figure 1 is a vertical longitudinal section of the apparatus in use. Fig. 2 is a plan view of the same apparatus.

In these views, A represents any suitable receptacle containing alcohol B having a depth preferably exceeding twice the diameter of the fruit. Preferably, the receptacle is partially covered by any suitable sheet D, to retard evaporation. The fruit, for example, oranges C, C', $C^2$, free from each other, is delivered in the liquid near one end of the receptacle. The heavier fruit being of greater weight than the liquid which it displaces, remains at the bottom of the receptacle, while the lighter and poorer fruit rises to the surface. The two grades are then removed and kept separate, and the alcohol quickly evaporates, not even its odor being perceptible after a short interval. The heavy fruit is usually worth more in the market than the entire mass from which it was separated and the loss of alcohol is but a small percentage, the cost of which is not relatively important.

When an orange has its outer surface broken, as by slight abrasion, cracking, or puncture, decay begins at the point of injury long before it would were the fruit perfect, and this is true although the injury be due to the mere pricking by a thorn and such as to escape careful scrutiny. In such cases, the highly penetrative alcohol enters the puncture and permeates the soft inner skin around the same, escaping only after a long time through the puncture, since the outer layer of the skin is nearly impervious to this liquid. The puncture being thus made for a long time practically germ proof, decay is prevented. If desired, however, such fruit may after the bath be readily separated because after a short time the alcohol gives, temporarily at least, a readily distinguished area around the puncture or the like.

Obviously, if the apparatus be of suitable size, many oranges or the like may be immersed simultaneously and in rapid succession, giving almost any desired rate of treatment, and while the fruit may be introduced and removed by hand, both operations are usually performed by automatic devices not shown. It is also plain that owing to the nature of the alcohol, the entire surface, even including the corrugations or folds of navel oranges, are effectively sterilized.

The use of absolute alcohol is not indispensable, and indeed the specific gravity of the liquid may be changed to suit different conditions, if the added constituents be not objectionable, a small quantity of water, for example, slightly changing the specific gravity without material detriment to the process.

What I claim is:

1. The process of grading fruit which varies in specific gravity, which consists in immersing said fruit in a highly volatile liquid of given specific gravity, and separately removing from said liquid the fruit that may float therein and the fruit that may sink therein.

2. The process of grading fruit which varies in specific gravity which consists in immersing said fruit in a highly volatile sterilizing liquid of given specific gravity, and separately removing from said liquid the fruit that may float therein and the fruit that may sink therein.

3. The process of grading fruit that varies in specific gravity which consists in immersing said fruit in alcohol of given specific gravity and separately removing from said alcohol the fruit that may float therein and the fruit that may sink therein.

In testimony whereof I affix my signature in presence of two witnesses.

DWIGHT C. LEFFERTS.

Witnesses:
ROBERT CRAIG GREENE,
JAMES L. CRAWFORD.